Nov. 23, 1954

W. H. DU BOIS 2,695,080

AIRCRAFT BRAKE ASSEMBLY

Filed Jan. 14, 1950

INVENTOR.
WILLIAM H. DU BOIS
BY
ATTORNEY

Nov. 23, 1954 W. H. DU BOIS 2,695,080
AIRCRAFT BRAKE ASSEMBLY
Filed Jan. 14, 1950 3 Sheets-Sheet 2

INVENTOR.
WILLIAM H. Du Bois
BY
G A Gust
ATTORNEY

Nov. 23, 1954     W. H. DU BOIS     2,695,080
AIRCRAFT BRAKE ASSEMBLY
Filed Jan. 14, 1950     3 Sheets-Sheet 3

INVENTOR.
WILLIAM H. DU BOIS
BY
*G A Gust*
ATTORNEY

United States Patent Office 2,695,080
Patented Nov. 23, 1954

2,695,080

AIRCRAFT BRAKE ASSEMBLY

William H. Du Bois, South Bend, Ind., assignor to Bendix Aviation Corporation, South Bend, Ind., a corporation of Delaware Application January 14, 1950, Serial No. 138,576

14 Claims. (Cl. 188—152)

The present invention relates to an aircraft disc brake assembly and more particularly to a brake assembly which lends itself to facile maintenance.

An object of the present invention is to provide a disc brake structure which may be disassembled without either removing the wheel from the plane, or lifting the wheel off the ground by means of a jack or the like.

Another object of the present invention is to provide a brake which is economical to manufacture, simple in construction, and reliable in operation. It is an ancillary object to provide a structure which is economical to service both from the time consumed in servicing and the cost of replacement parts.

A further object is to provide a structure utilizing a replaceable metal stamping which is removably secured in place and which provides the hydraulic actuator bore.

Another object is to provide a structure which utilizes an automatic adjusting mechanism which compensates for brake lining wear. Other objects will become apparent as the description proceeds.

Figure 1:
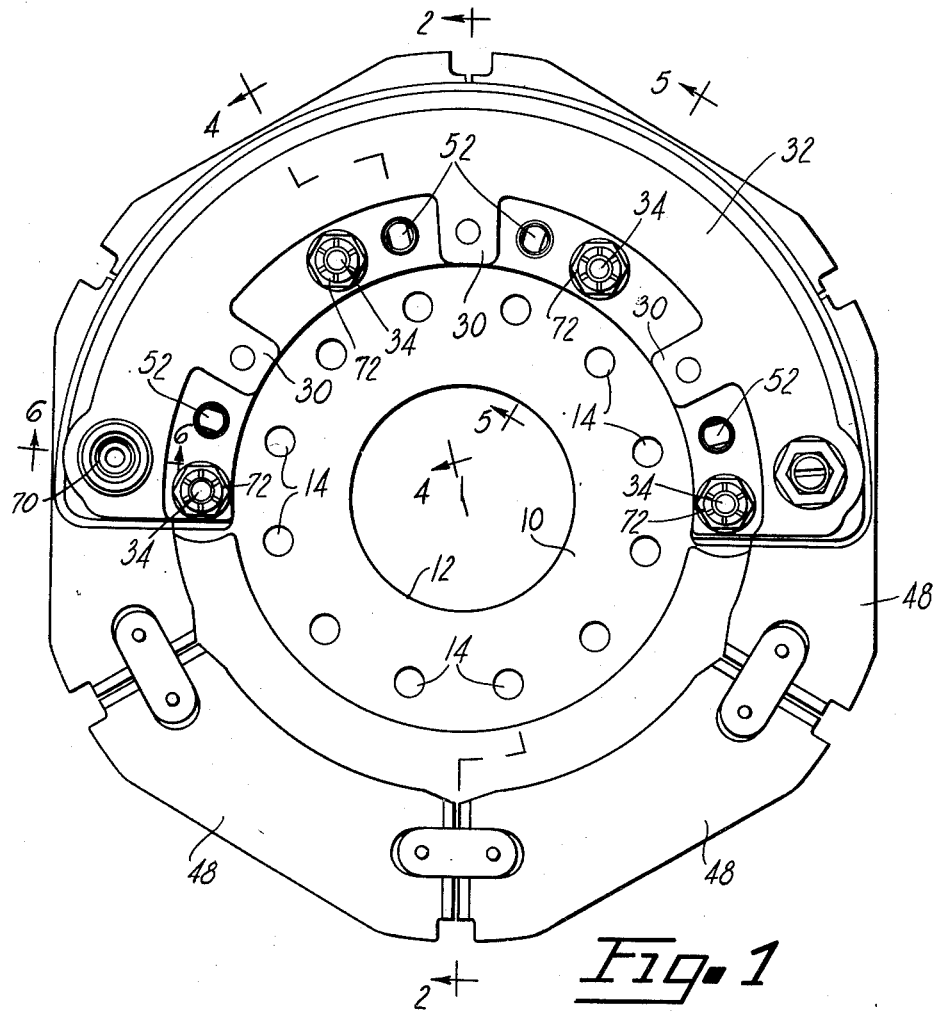
Figure 1 is a side elevation of an embodiment of the present invention.
Figure 2:
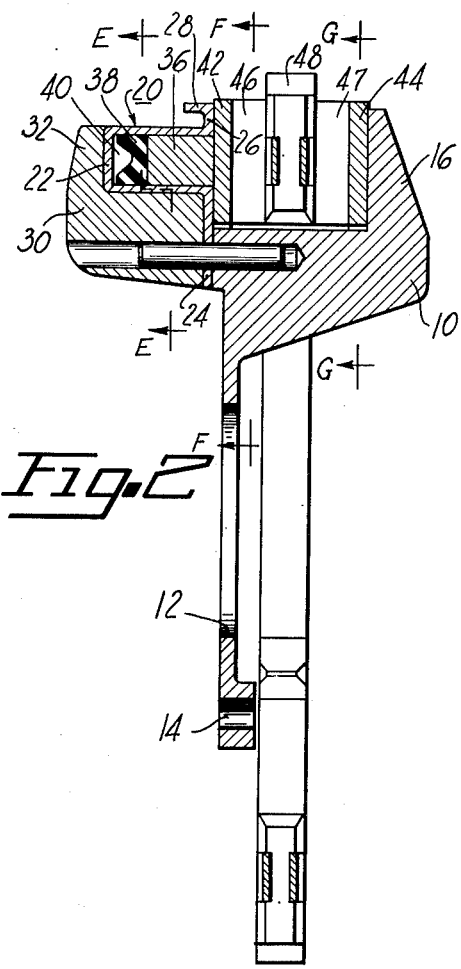
Figure 2 is a sectional view taken substantially on section line 2—2 of Figure 1.
Figure 5:
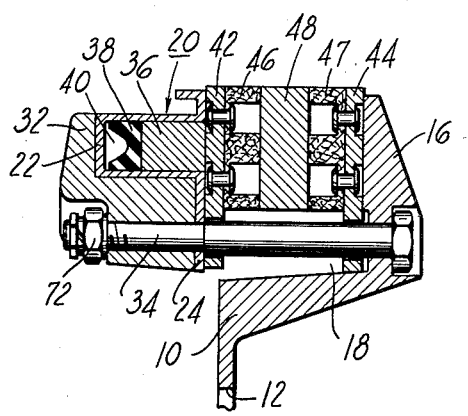
Figure 5 is a sectional view taken substantially on section line 5—5 of Figure 1.

Referring to the drawings and more particularly to Figures 1 and 2, a support disc 10 having a pilot aperture 12 and a plurality of circumferentially spaced mounting holes 14 carries as an integral part thereof an axially offset, radially outwardly extending semi-annular or curved reaction member 16. The support disc 10 is provided at circumferentially spaced points located radially inwardly from reaction member 16 with sockets or openings 18 for a purpose which will hereafter become apparent.

Fitted to the outer peripheral portion of support disc 10 is a semi-annular or curved stamping 20 which constitutes the cylinder for the hydraulic actuator used in this brake assembly. This stamping is illustrated as having the arcuate length of a semicircle; however, it is to be understood that this invention covers any similar type of stamping or housing which is in the shape of an annulus or a segment of an annulus. The claims and description refer to this shape as being semi-annular or curved.

The stamping 20 comprises a channel shaped portion 22 which flares radially inwardly adjacent its open end into a flange 24 which abuts against support disc 10 and a flange 26 which is bent back on itself at 28 to serve as a stiffening member.

A semi-annular or curved retaining member 30 secures housing 20 in place, and as observed in Figure 2, is provided with a radial flange 32 which engages the closed end of channel 22, and a suitably formed portion which abuts against flange 34. Retaining member 30 is held in place on support disc 10 by means of a plurality of circumferentially spaced bolts 34, whereby stamping 20 is rigidly clamped between said retaining member and said support disc. A piston 36 is reciprocably received in the bore of channel 22 and carries on its working end a rubber, or the like, sealing member 38, said sealing member preventing leakage of fluid from chamber 40, formed between the closed end of channel 22 and the sealing member 38. A pressure plate 42 of semi-annular or curved shape is acted upon by piston 36 and is capable of axial movement on bolts 34 but is thereby held against rotation. A backing plate 44, adjacent the reaction member 16, is also keyed for axial movement only on bolts 34. Suitable brake linings may be fastened to these plates 42 and 44 as indicated by reference numerals 46 and 47, respectively. A rotatable brake element 48 is disposed between the linings on plates 42 and 44 whereby outward movement of piston 36 may effect operative frictional engagement of plates 42 and 44 with element 48. The use of these linings 46 and 47 is, of course, optional, depending upon the preferred design.

Figure 4:
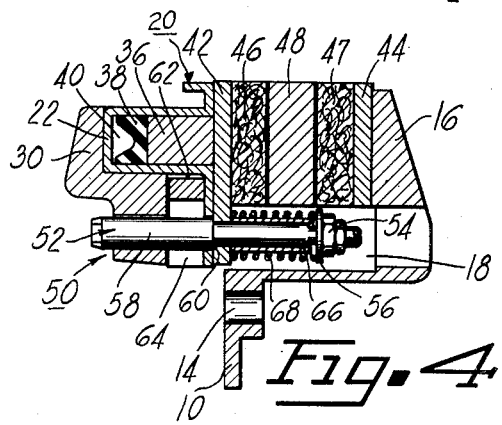
Figure 4 is a sectional view taken substantially on section line 4—4 of Figure 1.
Figure 3:
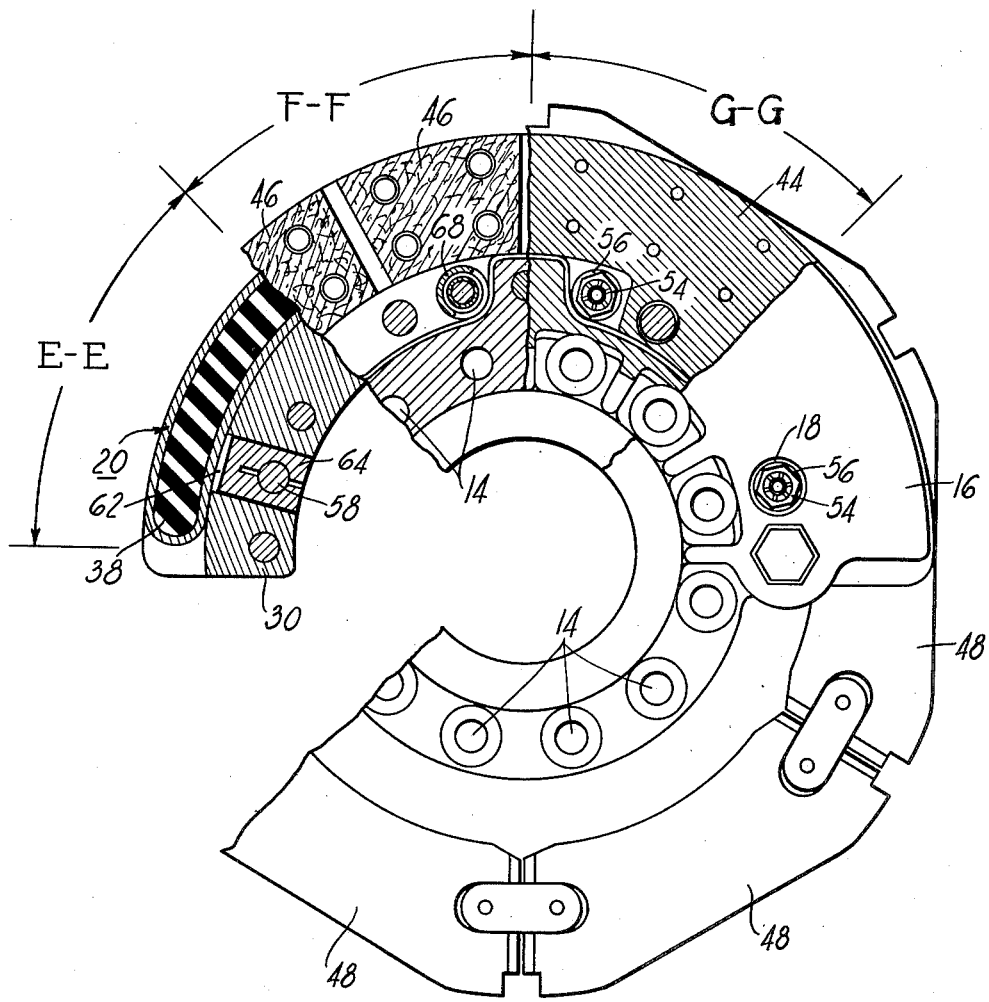
Figure 3 is a sectional side elevation of the back side of Figure 1 taken substantially on section lines E—E, F—F, and G—G, of Figure 2.

Reference now being made to Figure 4, it is seen that a plurality of automatic adjusting devices 50 are disposed in certain of the openings 18. Each device comprises a pin 52 projecting through registering openings in retainer 30 and pressure plate 42 to receive on its extreme right end a nut 54 which engages an abutment or washer 56. The left half of pin 52 is enlarged at 58 thereby providing a shoulder 60 which is adapted to engage the left side of pressure plate 42. Around each opening in retainer 30 which receives said portion 58 and adjacent pressure plate 42 is a cavity or socket 62 adapted to receive a clamping washer 64 which is preferably made of resilient material. As viewed in Figure 3, washer 64 frictionally surrounds portion 58 to hold pin 52 in axial position. The washer 64 is prevented from leftward movement by the bottom of socket 62 and from rightward movement by flange 24 of stamping 20. Thus there is no chance of washer 64 becoming disengaged from the pin 52 regardless of the relative position of the aircraft upon which the present invention is used. Slidably received on the small diameter end of pin 52 is a sleeve 66 which has length differing from the distance from pressure plate 42 to washer 56 by an amount equal to the desired brake disc running clearance. A compression spring 68 surrounds sleeve 66 to act between washer 56 and pressure plate 42 to urge the brake to released position.

Figure 6:
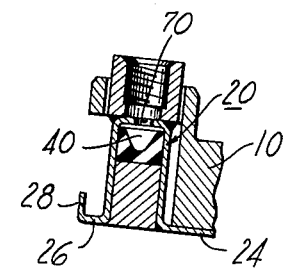
Figure 6 is a section taken substantially on section line 6—6 of Figure 1.

In operation, fluid under pressure is admitted to chamber 40 (see Figure 6) through an opening 70 in channel 22. Piston 36 is thereby forced outwardly to compress rotatable element 48 between the lined plates 42 and 44. To release the brakes, the pressure in chamber 40 is reduced allowing springs 68 to return pressure plate 42 to the point where the desired brake clearance is obtained.

The automatic adjustors 50 function as follows. Assuming the lining to be worn an amount requiring brake adjustment, application of the brakes will cause movement of pressure plate 42 toward the right carrying with it sleeves 66. As soon as the clearance between sleeves 66 and the respective washers 56 is taken up and the pressure plate 42 continues to move toward the right, pins 52 will be picked up and carried to the right until engagement between rotor 48 and plates 42 and 44 is obtained. Movement of pins 52 toward the right is accomplished against the frictional resistance of the washers 64. Upon release of the brakes, springs 68 urge pressure plate 42 toward the left until it engages shoulders 60 on the pins 52. Since the shoulders 60 now protrude slightly beyond the right-hand edge of flange 24 the pressure plate 42 assumes an adjusted, spaced position with respect to this edge.

While the illustrated embodiment discloses the use of only one semi-annular actuating sub-assembly, it is to be understood that another similar section may be added to the brake without departing from the scope of this invention.

When it is necessary to repair the brake, the nuts 72 on bolts 34 are removed and the retainer 30 and the stamping 20 are lifted off the assembly. Stamping 20 obviously will then easily separate from retainer 30. If the channel 22 is worn to such an extent that it is necessary to replace it, a new stamping is used as a replacement, thereby eliminating the necessity of either using a completely new carrier machined with cylinder bores or reforming the old cylinder bores thus requiring the use of new pistons of sizes larger than the original ones.

Further, this disassembling may be performed without either removing the wheel from the plane or jacking the plane off the ground. Time consumed in making repairs to the brake is obviously substantially reduced.

Although only one embodiment of the invention has been illustrated and described, various changes in the form and relative arrangements of the parts may be made to suit requirements.

I claim:

1. An aircraft brake assembly comprising a non-rotatable support disc having a pilot aperture and a plurality of circumferentially spaced openings adapted to receive mounting bolts, an axially offset radially outwardly extending semi-annular reaction member carried by said disc, a semi-annular channel shaped stamping on said support disc axially spaced from and in juxtaposition with said reaction member, said stamping having a radially inwardly extending flange adapted to abut against said support disc, a semi-annular piston reciprocably received in said channel shaped stamping, a semi-annular retaining member formed to accommodate a portion of said stamping, a plurality of circumferentially spaced bolts fastening said retaining member to said support disc, said stamping being rigidly clamped between said retaining member and said support disc, a semi-annular pressure plate keyed for axial movement on said bolts and operatively associated with said piston, said pressure plate carrying a friction lining, a semi-annular backing plate keyed for axial movement on said bolts and abutting against said reaction member, said backing plate carrying a friction lining, and an annular rotatable brake element adapted to be frictionally engaged by said pressure plate and said backing plate; a plurality of automatic adjusting devices carried by said retaining member, each device comprising a pin, provided with an enlarged end portion, slidably received in companion axially extending openings in said retaining member and said stamping, the shoulder formed on said pin by the enlarged end portion engaging the piston-side of said pressure plate, the smaller end portion of said pin receiving an axially adjustable abutment, a sleeve slidably received on said smaller end portion engageable by said pressure plate and having a length equal to the distance between the adjacent side of said pressure plate and said abutment less the predetermined brake clearance, a helical spring surrounding said sleeve and compressed between said pressure plate and said abutment, said retaining member being provided in its side adjacent the pressure plate with sockets circumscribing the respective pin openings, and split resilient washers fractionally clamped on corresponding pins and disposed in respective sockets, said sockets preventing axial displacement of said washers.

2. An aircraft brake assembly comprising a non-rotatable support disc having a pilot aperture and a plurality of circumferentially spaced openings adapted to receive mounting bolts, an axially offset radially outwardly extending semi-annular reaction member carried by said disc, a semi-annular channel shaped stamping on said support disc axially spaced from and in juxtaposition with said reaction member, said stamping having a radially inwardly extending flange adapted to abut against said support disc, a semi-annular piston reciprocably received in said channel shaped stamping, a semi-annular retaining member formed to accommodate a portion of said stamping, said stamping being rigidly clamped between said retaining member and said support disc, a semi-annular pressure plate held against rotation but capable of axial motion operatively associated with said piston, a semi-annular backing plate held against rotation but capable of axial motion abutting against said reaction member, and an annular rotatable brake element adapted to be frictionally engaged by said pressure plate and said backing plate; a plurality of automatic adjusting devices carried by said retaining member, each device comprising a pin, provided with an enlarged end portion, said pin being slidably received in companion axially extending openings in said retaining member and said pressure plate, the shoulder formed on said pin by the enlarged end portion engaging the piston-side of said pressure plate, the smaller end portion of said pin receiving an axially adjustable abutment, a sleeve slidably received on said smaller end portion engageable by said pressure plate and having a pre-determined length, a helical spring surrounding said sleeve and compressed between said pressure plate and said abutment, said retaining member being provided in its side adjacent the pressure plate with socket circumscribing respective pin openings, and split resilient washers frictionally clamped on corresponding pins and disposed in sockets, said sockets preventing axial displacement of said washers.

3. An aircraft brake assembly comprising a non-rotatable support disc having an axially offset radially outwardly extending semi-annular reaction member, a semi-annular channel shaped stamping on said support disc reciprocably receiving a piston member, a retaining member adapted to clamp said stamping onto said support disc in axially spaced relation with said reaction member, a stator brake element operatively associated with said piston, and a rotatable brake element operatively disposed between said stator brake element and said reaction member; a plurality of automatic adjusting devices carried by said retaining member, each device comprising a pin, provided with an enlarged end portion, said pin being slidably received in companion axially extending openings in said retaining member and said pressure plate, the shoulder formed on said pin by the enlarged end portion engaging the piston-side of said pressure plate, the smaller end portion of said pin receiving an axially adjustable abutment, a sleeve slidably received on said smaller end portion engageable by said pressure plate and said abutment and having a predetermined length, a helical spring surrounding said sleeve and compressed between said pressure plate and said abutment, said retaining member being provided in its side adjacent the pressure plate with sockets circumscribing respective pin openings, and split resilient washers frictionally clamped on corresponding pins and disposed in respective sockets, said sockets preventing axial displacement of said washers.

4. An aircraft brake assembly comprising a non-rotatable support having an axially offset radially outwardly extending curved reaction member, a curved channel shaped stamping on said support reciprocably receiving a piston member, a retaining member adapted to clamp said stamping onto said support in axially spaced relation with said reaction member, a stator brake element operatively associated with said piston, a rotatable brake element operatively associated with said stator brake element and said reaction member; a plurality of adjusting devices carried by said retaining member for maintaining a predetermined clearance between the stator and rotatable brake elements, and resilient means associated with said adjusting devices urging the brake to released position.

5. An aircraft brake assembly for use with rotatable brake means comprising a non-rotatable support having a plurality of circumferentially spaced openings adapted to receive mounting bolts, a radially outwardly extending curved reaction member carried by said support, a curved channel shaped stamping abutting said support radially outwardly beyond the area of said mounting openings, a piston reciprocably received in said stamping and adapted to be moved under fluid pressure contained in the chamber formed between said stamping and said piston, and a retaining member adapted to clamp said stamping onto said support in axially spaced relation with said reaction member, said retaining member being removably fastened to said support radially outwardly beyond the circle of said mounting holes.

6. An aircraft brake assembly for use with rotatable brake means comprising a non-rotatable support having a radially inwardly extending mounting portion, a radially outwardly extending curved reaction member carried by said support, a curved channel shaped stamping abutting said support radially outwardly beyond said mounting portion, a piston reciprocably received in said stamping and adapted to be moved under fluid pressure contained in the chamber formed between said stamping and said piston, and a retaining member adapted to clamp said stamping onto said support in axially spaced relation with said reaction member, said retaining member being removably fastened to said support radially outwardly beyond said mounting portion.

7. An aircraft brake assembly for use with rotatable brake means comprising a non-rotatable support having a radially inwardly extending mounting portion, a radially outwardly extending curved reaction member carried by said support, a curved channel shaped stamping, a piston reciprocably received by said stamping, and a retaining member adapted to secure said stamping to said support in juxtaposition with said reaction member, said retaining member being removably secured to said support radially outwardly beyond the area of said mounting portion.

8. For use in an aircraft disc brake assembly having a non-rotatable disc member for supporting a hydraulically actuated, brake-applying piston, a stamping constituting a segmented annular cylinder housing adapted to reciprocably receive the piston, said housing having an axially extending thin channel shaped cross-section, the ends of the walls of said channel section which define the housing opening flaring radially away from said opening, one of said radially flared ends being bent longitudinally backward to serve as a stiffening member, and the other of said ends being formed to act both as a stiffening member and as a means whereby the stamping can be releasably secured to said disc member for outward radial withdrawal therefrom.

9. For use in an aircraft disc brake assembly having a non-rotatable disc member for supporting a hydraulically actuated, brake-applying piston, a stamping constituting a segmented annular cylinder housing adapted to reciprocably receive the piston, said housing having a thin channel shaped cross-section, the ends of the walls of said channel section which define the housing opening flaring radially away from said opening to serve as stiffening members for the housing, one of said radially flared ends being formed to act as a fastening element for releasably securing the stamping to said disc member to thereby facilitate outward radial withdrawal from the disc member.

10. For use in an aircraft disc brake assembly having a non-rotatable disc member for supporting a hydraulically actuated, brake-applying piston, a stamping constituting a segmented annular cylinder housing adapted to reciprocably receive the piston, said housing having an axially extending thin channel shaped cross-section, the ends of the walls of said channel section which define the housing opening flaring radially away from said opening, one of said radially flared ends being formed to act as a fastening element for releasably securing said stamping to the disc member to thereby facilitate radial withdrawal from the disc member.

11. An aircraft brake assembly comprising a non-rotatable support having an axially offset radially outwardly extending reaction member, a channel shaped stamping on said support, a piston member reciprocably received by said stamping, a retaining member adapted to clamp said stamping onto said support in axially spaced relation with said reaction member, a stator brake element operatively associated with said piston, a rotatable brake element operatively associated with said stator brake element and said reaction member; a plurality of adjusting devices carried by said retaining member for maintaining a predetermined clearance between the stator and rotatable brake elements, and resilient means associated with said adjusting devices urging the brake to released position.

12. An aircraft brake assembly for use with rotatable brake means comprising a non-rotatable support having a plurality of circumferentially spaced openings adapted to receive mounting bolts, a radially outwardly extending reaction member carried by said support, a channel shaped stamping abutting said support radially outwardly beyond the area of said mounting openings, a piston reciprocably received in said stamping and adapted to be moved under fluid pressure contained in the chamber formed between said stamping and said piston, and a retaining member adapted to clamp said stamping onto said support in axially spaced relation with said reaction member, said retaining member being removably fastened to said support radially outwardly beyond the circle of said mounting holes.

13. An aircraft brake asembly for use with rotatable brake means comprising a non-rotatable support having a radially inwardly extending mounting portion, a radially outwardly extending reaction member carried by said support, a channel shaped stamping abutting said support radially outwardly beyond said mounting portion, a piston reciprocably received in said stamping and adapted to be moved under fluid pressure contained in the chamber formed between said stamping and said piston, and a retaining member adapted to clamp said stamping onto said support in axially spaced relation with said reaction member, said retaining member being removably fastened to said support radially outwardly beyond said mounting portion.

14. An aircraft brake assembly for use with rotatable brake means comprising a non-rotatable support, a radially outwardly extending reaction member carried by said support, a channel shaped stamping, a piston reciprocably received by said stamping, and a retaining member adapted to secure said stamping to said support in juxtaposition with said reaction member, said retaining member being removably secured to said support radially outwardly beyond the area of said mounting portion.

References Cited in the file of this patent

UNITED STATES PATENTS

| Number | Name | Date |
|---|---|---|
| 2,009,301 | Rode et al. | July 23, 1935 |
| 2,055,970 | Fippard | Sept. 29, 1936 |
| 2,172,788 | Christensen | Sept. 12, 1939 |
| 2,392,970 | Bricker | Jan. 15, 1946 |
| 2,483,362 | Du Bois et al. | Sept. 27, 1949 |
| 2,612,419 | Reynolds | Sept. 30, 1952 |